United States Patent

[11] 3,602,253

| [72] | Inventors | Rene Henri Louis Bahout<br>Argenteuil;<br>Pierre Raymond Gicquel, Paris, both of,<br>France |
|---|---|---|
| [21] | Appl. No. | 821,250 |
| [22] | Filed | May 2, 1969 |
| [45] | Patented | Aug. 31, 1971 |
| [73] | Assignee | Societe Pour L'Equipement Des Industries<br>Chimiques Speichim<br>Paris, France |
| [32] | Priority | May 9, 1968 |
| [33] | | France |
| [31] | | 151186 |

[54] VALVE CAP FOR AN EXCHANGE COLUMN
12 Claims, 24 Drawing Figs.

[52] U.S. Cl...................................................... 137/513.5,
137/533.17, 261/114 VT
[51] Int. Cl...................................................... B01d 47/00

[50] Field of Search.......................................... 137/513.3,
513.5, 533.17; 261/113, 114 US, 114.1, 114 VT

[56] References Cited
UNITED STATES PATENTS
| 3,210,056 | 10/1965 | Van't Sant.................... | 137/513.5 X |
| 3,215,414 | 11/1965 | Van't Sant.................... | 137/513.5 X |
| 3,427,007 | 2/1969 | Braun........................... | 261/114 VT |

*Primary Examiner*—Laverne D. Geiger
*Assistant Examiner*—David J. Zobkiw
*Attorney*—Stevens, Davis, Miller & Mosher

ABSTRACT: A valve cap for an exchange column and having a separately formed clip for limiting valve lift, the clip being assembled to the cover by passing legs of the clip through apertures in the cover before the clip is deformed to prevent separation of the clip and cover. The deformation may be caused either by elastic deformation before assembly or plastic deformation after assembly.

VALVE CAP FOR AN EXCHANGE COLUMN

The present invention relates to a valve cap for an exchange column.

It is known to provide exchange columns for exchanges between liquid or gaseous fluids forming different phases, for example columns for distillation, absorption, washing or extraction, such columns including apertures which are adapted to be masked or unmasked by movable members referred to as "valve caps." These members, whether they are imperforate or perforated, are gravity biased to remain on their seats and are lifted by the ascending flow of gas or vapor or less dense liquid phase when the differential pressure exceeds a certain value.

The present invention has been designed with a view to guiding the valve cap and limiting the lift of the cap in use of the column.

Some known valves are provided with legs which serve to guide them and limit their travel. The legs are elastic or elastically deformable but their design is such that a considerable force must be applied at right angles to the tray for positioning the legs in the tray aperture, and this involves a serious risk of deforming the valve and the tray. Moreover with such a device it is not easy to remove a valve to inspect, repair or replace it.

The present invention has as its principal object to provide a valve cap which overcomes the above disadvantage.

The invention is applicable to all forms of valves, whether they are round, polygonal, planar, concave, or convex, and whether their edges are flat, folded over, undulated or toothed.

According to the present invention we provide a valve cap for an exchange column, such cap comprising a valve cover, and a separately formed clip including at least two arms adapted to lie above the upper face of the cover and legs adapted to extend downwardly through suitably formed apertures in the cover, the legs including laterally extending portions spaced from the top thereof and which may pass downwardly through the apertures in the cover during assembly of the clip and cover but may, by distortion of the clip before or after positioning of the cap on the tray, be displaced to underlie the part of a tray adjacent a valve opening of an exchange column thereby limiting the upward movement of the cap relative to the tray.

The clip may be free with respect to the valve cover and with respect to the tray or it may be fixed to the tray and free with respect to the valve cover.

The clip may more particularly be in the form of a V or a Ω or even lyre-shaped and the shape of the arms may be modified elastically or plastically either by hand or with the aid of a tool.

In order that the present invention may more readily be understood, the following description is given, merely by way of example, with reference to the accompanying drawings in which:

FIG. 10 is an elevation, and FIG. 11 a plan partly broken away, showing a fourth embodiment;

FIG. 15 shows a section taken on the line XV—XV of FIG. 16 which in turn shows an elevational view of a fifth embodiment;

FIG. 17 is a development view of the bar clip of FIGS. 15 and 16;

FIG. 18 is a section on line XVIII—XVIII of FIG. 19 which in turn shows in plan a sixth embodiment;

FIG. 20 is a section on the line XX—XX of FIG. 19;

Figures 1, 2, 3:
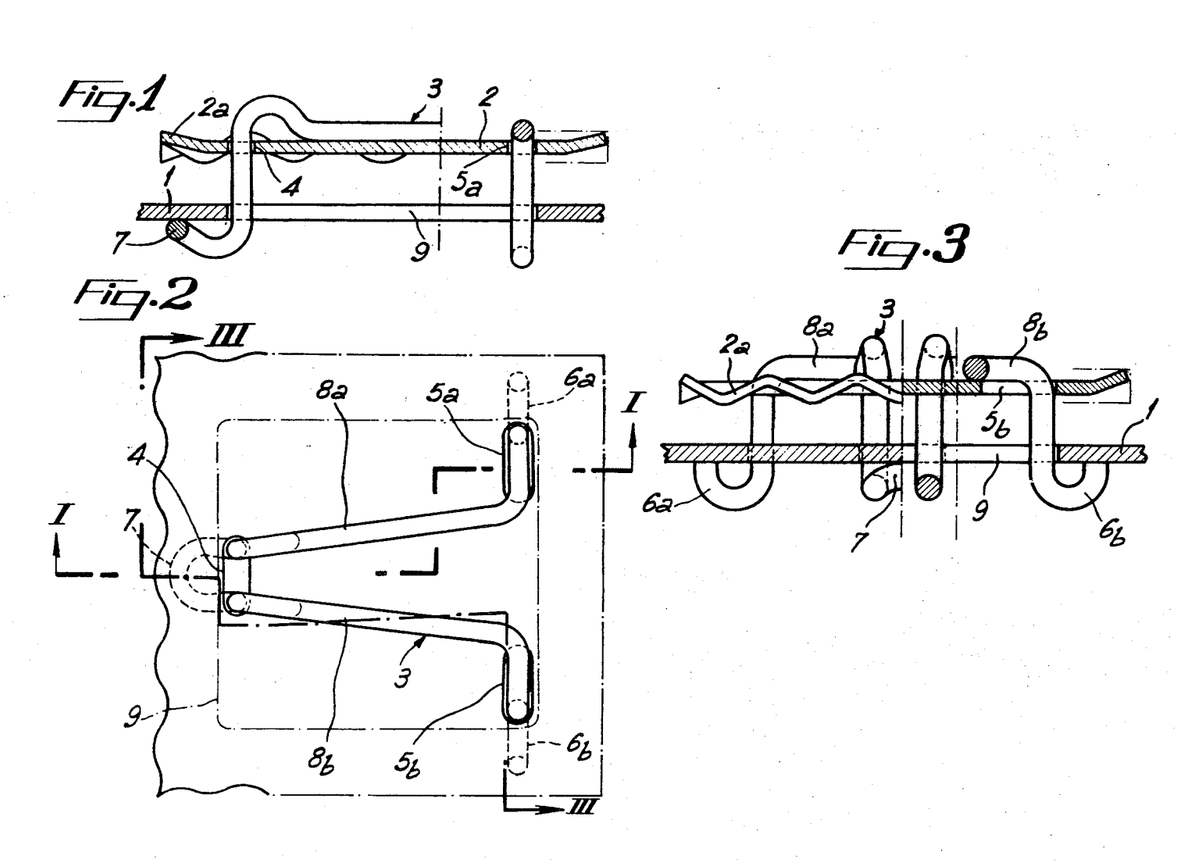
FIG. 1 is a section taken in line I—I of FIG. 2.
FIG. 2 shows a top plan view of a square valve provided with a clip of the present invention.
FIG. 3 is a section taken on the line III—III of FIG. 2.

Referring now to FIGS. 1 to 3, there is shown a valve comprising a square valve cover 2 in combination with a clip 3 of elastic metal wire. The cover 2 may be provided with undulations 2a over its entire periphery so that even when it rests on the tray 1 and masks an associated aperture 9 of the tray, fluid can nevertheless flow from below the tray to above. The valve cover is perforated with three apertures 4, 5a, and 5b which are disposed parallel to one side of the tray and are of a width slightly greater than the diameter of the wire constituting the clip 3.

The wire clip comprises two divergent arms 8a and 8b which are placed above the cover and which, at one end, are connected by a downwardly bent-over loop to engage in the aperture 4 and follow therein a path corresponding to the maximum lift of the valve, then curved again in the opposite sense to form a retaining hook 7 disposed below the tray 1. At the other end, the arms 8a and 8b are provided with two elbow bends in mutually perpendicular planes to terminate in downwardly convex hook portions 6a and 6b. Alternatively the hook portions 6a and 6b may be replaced by further simple 90° elbows.

The hook 7 of the clip is inserted in the valve cover through the aperture 4, then the clip is pivoted to bring the divergent arms 8a and 8b parallel to the cover. Manually or by means of a tool in the form of grippers, the arms 8a and 8b are bent towards a mutually parallel configuration so as to render the hooks 6a and 6b capable of being engaged in the apertures 5a and 5b.

Before the pressure is relaxed, the hook 7 is engaged in the aperture 9 of the tray and brought into abutment against the left-hand edge so that the hooks 6a, 6b may themselves be engaged in the aperture 9. The set of hooks 6a, 6b and 7 is then pushed through the aperture and the pressure relaxed. As the arms 8a and 8b return to the position shown in the drawings by the elasticity of the clip, guiding of the valve cover is ensured, and the clip provides a limitation of valve cover travel in the upward sense.

Figure 4:
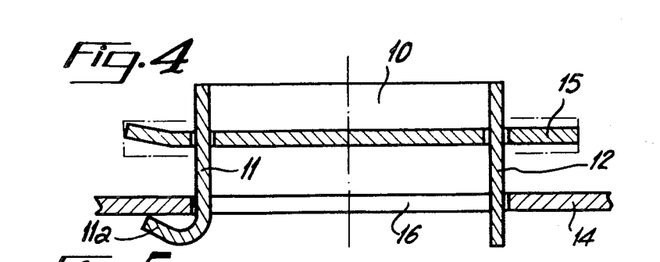
FIG. 4 is a section taken along line IV—IV of FIG. 5.
Figure 5:
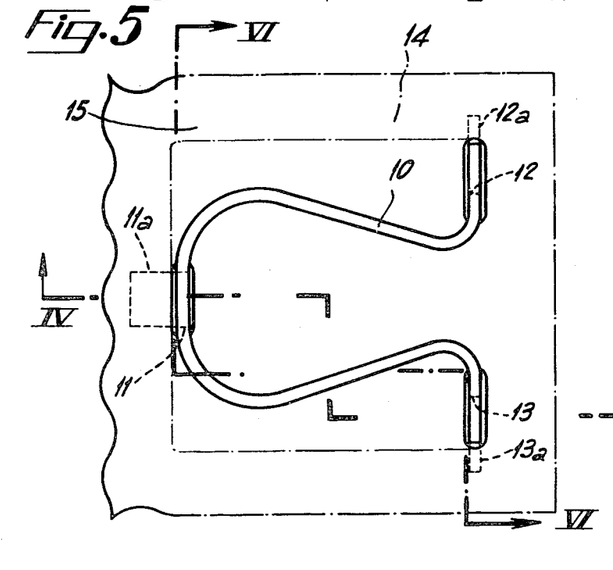
FIG. 5 is a variant of the present invention, the clip being made from a small bar of metal.
Figure 6:
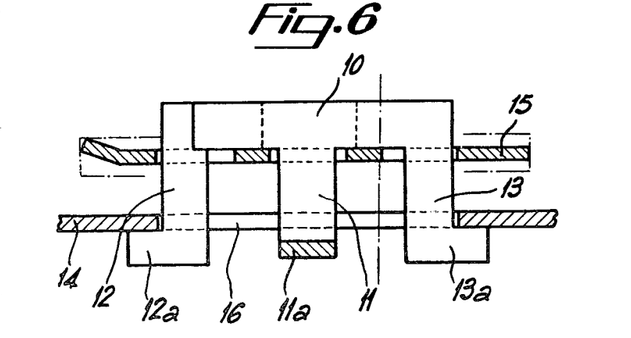
FIG. 6 is a section taken along line VI—VI of FIG. 5.

FIGS. 4 to 6 relate to a further embodiment in which the wire constituting the clip has been replaced by a piece of sheet metal cut out and folded; this piece of sheet metal comprises a strip 10 in the shape of a letter Ω, when viewed in plan as shown in FIG. 5. Feet 11, 12, 13 extend downwards form the middle and the ends, the foot 11 at the middle of the strip having its lower edge folded upwardly to form a hook 11a while the feet 12 and 13 at the ends of the strip have laterally projecting tab portions at their lower ends to form retaining hooks 12a and 13a respectively. The valve cover 2 disposed above the valve opening 16 in the tray 15, is provided with apertures similar to those shown in FIGS. 1 to 3.

Each of the foregoing embodiments of the clip lends itself for use with valves having covers which may alternatively be other than square, for example rounded, or any nonsquare polygonal form such as triangular, rectangular, pentagonal, or hexagonal.

Figure 7:
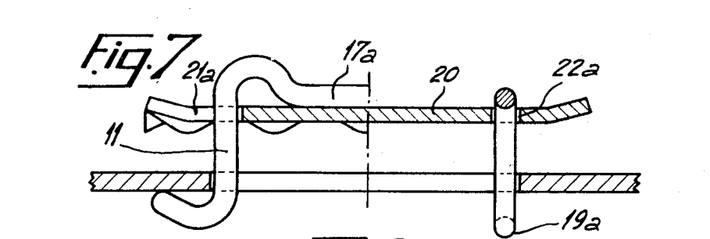
FIG. 7 is a section taken along line VII—VII of FIG. 8.
Figure 8:
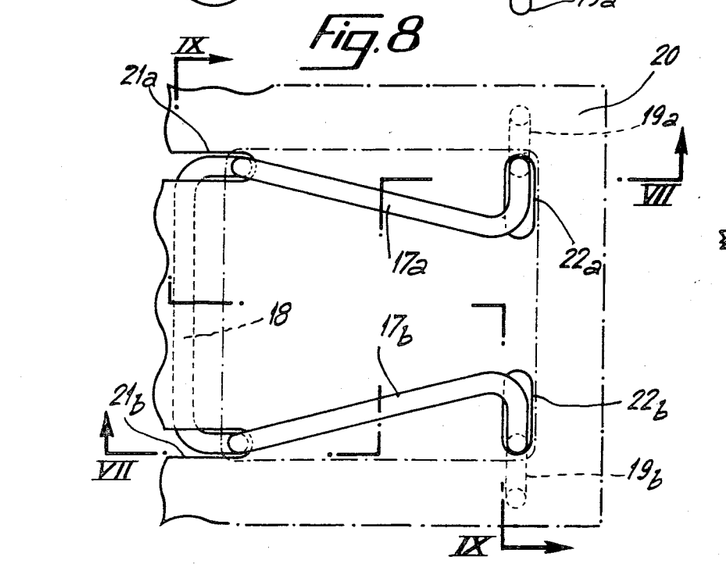
FIG. 8 shows a further variant of the present invention having a wire clip.
Figure 9:
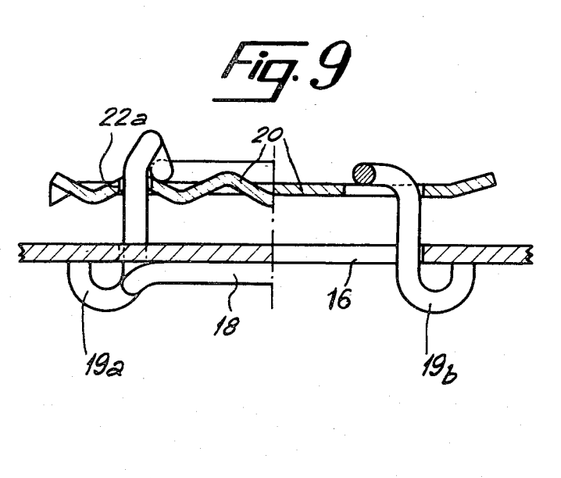
FIG. 9 is a section taken along IX—IX of FIG. 8.
Figures 10, 11:
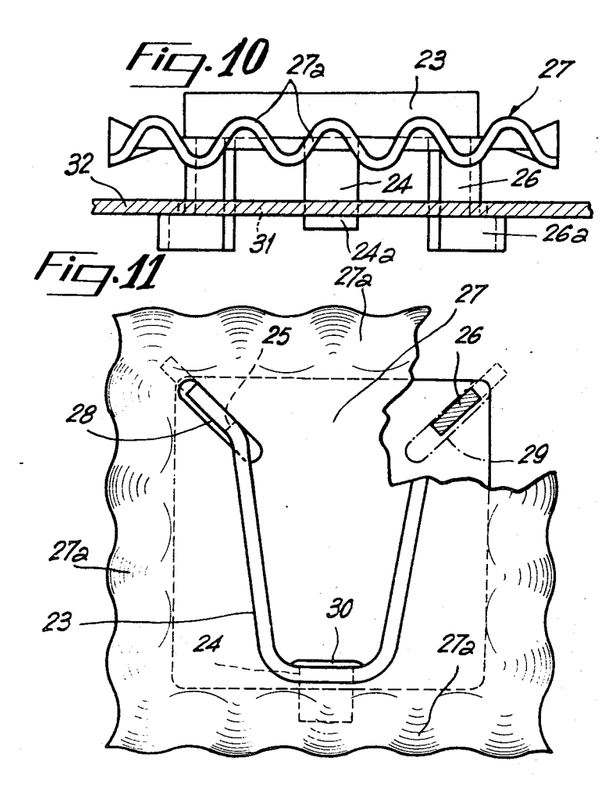

The clip shown in FIGS. 7 to 9 when viewed in plan, has a shape resembling that of FIGS. 4 to 6 but is made of wire as is the clip of FIGS. 1 to 3, the wire being provided with elbow bends similar to those shown in FIGS. 1 to 3. The loop which connects the arms 17a and 17b has its lower portion bent upwardly and outwardly to form a large retaining bar 18 which fits under the tray adjacent the aperture 16. The arms 17a and 17b at their other ends terminate in hooks 19a and 19b similar to the hooks 6a and 6b of FIGS. 1 to 3. The cover 20 which is shown as having an undulated periphery has a pair of peripheral slots 21a and 21b to receive the vertical portions or feet 11 of the loop, and apertures 22a and 22b, corresponding to the apertures 5a and 5b of FIGS. 1 to 3, are provided to receive the hooks 19a and 19b. The spacings of the slots 21a and 21b and the apertures 22a and 22b are preferably such that, as shown in FIG. 8, the vertical portions 11 of the loop and those of the hooks 22a and 22b are equidistant in use of the clip. Such a clip is thus longer and more flexible and the feature of guiding at four points on the valve cover is more suitable for square or rectangular-shaped valves.

Figures 12, 14:
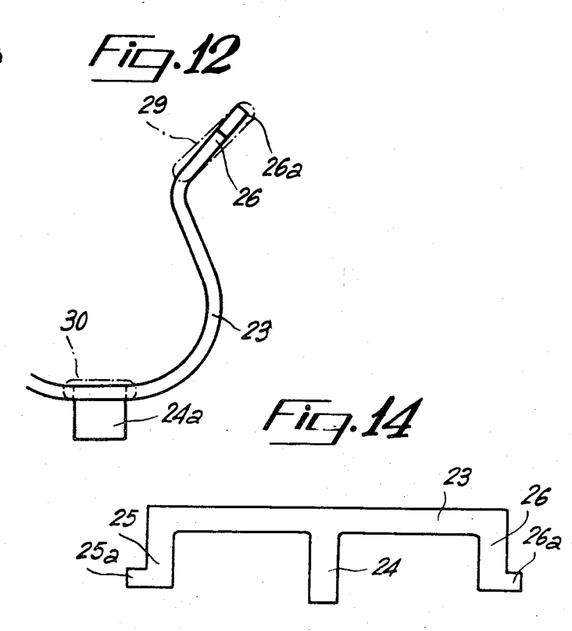
FIGS. 12 and 13a and 13b illustrate diagrammatically the mounting of the clip on the valve cover.
FIG. 14 shows a development view of the bar type of clip of FIGS. 10 to 13a and 13b.

In the example shown in FIGS. 10 to 14, the valve cover is combined with a sheet metal clip which, before mounting, has the lyre-shaped form shown clearly in FIG. 12. This clip is made from a small strip of metal 23 cut away to leave a central tongue 24 and shorter terminal feet 25 and 26, the outwardly facing edge of the feet being provided with projecting portions 25a and 26a. The bar is curved to have the plan form indicated in FIGS. 12 and the end 24a of the central tongue 24 is bent at right angles to constitute a retaining hook.

To receive such a clip the valve cover 27, assumed to be of square form and provided with peripheral undulations 27a has diagonally extending elongate apertures 28 and 29 adjacent one edge of the square, and another aperture 30, parallel and adjacent to the edge of the square remote from the one edge, the apertures 28, 29, and 30 being arranged to receive the respective feet 25 and 26 and the tongue 24. The valve cover 27 is intended to mask a square aperture 31 in the tray 32.

Figure 13A:
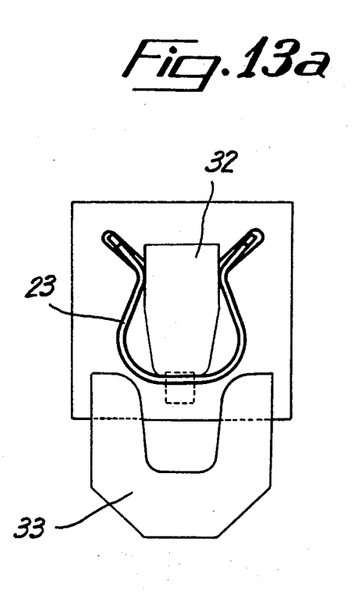
Figure 13B:
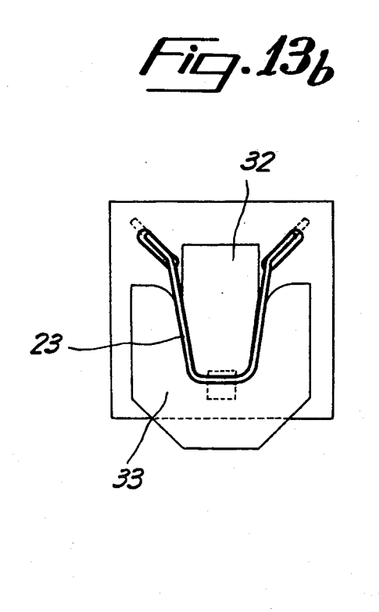

The valve cover is mounted in position as follows. First of all the end tab 24a of the curved tongue 24 is inserted in the aperture 30 and then the clip is pivoted about the tab so that the feet 25 and 26 move downwardly into the apertures 28 and 29 through which they pass, without forcing, but slightly obliquely as shown in FIG. 12. The assembly comprising the cover and clip is then engaged in the aperture 31 of the tray 32, the tab 24a of the tongue 24 abuttingly engaging under the edge of the aperture adjacent the middle of one side of the square (FIG. 12). FIG. 13 shows a tool, similar to a pair of pliers, having one jaw 32 which fits within the clip and the other jaw 33 in the form of a rounded V fitting outside the clip, is used to deform the clip to make it assume the rounded V shape of the pliers by moving the jaws 32 and 33 towards one another. This plastic deformation of the metal clip has the result of moving the feet 25 and 26 away from the center of the valve, bringing the planes of the feet more nearly parallel to the corresponding diagonal planes of the valve. The projecting portions 25a and 26a of the feet are simultaneously engaged below the tray and unite the valve cover and clip assembly with the tray for limited relative movement.

The constructional form which has just been described is very suitable for valves of round or polygonal shape (rectangular, triangular, pentagonal, hexagonal, etc.).

Two of the guiding feet (25 and 26) are directed in planes parallel to the flow of the vapor or other ascending phase, thus reducing the pressure loss. The third foot or tongue creates a very slight obstacle to flow. This arrangement of the feet provides a small component of vapor speed outside the valve in the sense away from the apex of the V towards its arms (i.e. upwards in FIG. 11), and this promotes the flow of the other phase on the tray.

Figures 15, 16, 17:
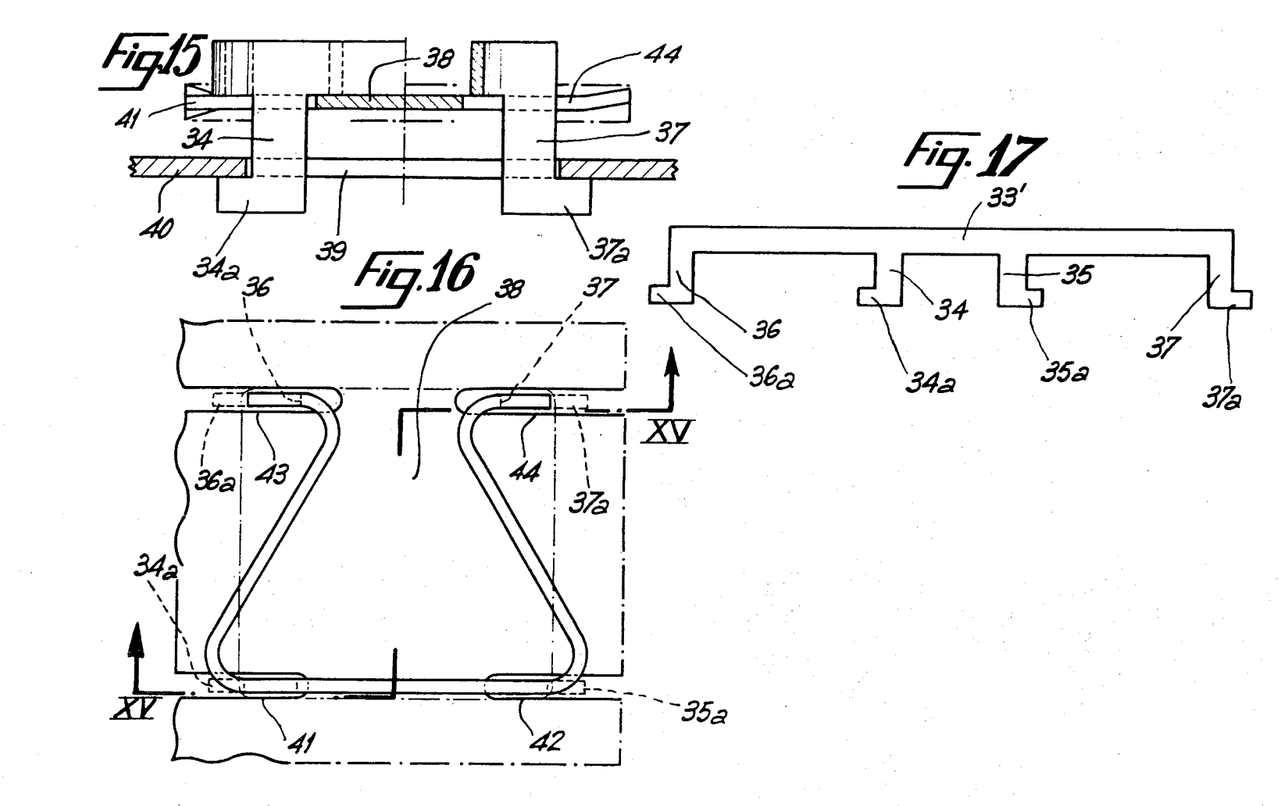

A modified embodiment is illustrated in FIGS. 15 to 17, and in this case the bar 33' is cut out, as shown in FIG. 17, to have two central feet 34, 35 and terminal feet 36, 37, the respective pairs of feet being provided with respective pairs of oppositely directed lateral catches 34a, 35a and 36a 37a. These catches, as in FIGS. 10 to 14, have the function of limiting the lift of the valve. In FIGS. 15 to 17, the clip is employed with a square valve cover 38 with corrugated periphery, positioned above an aperture 39 of a tray 40. This cover has parallel slots 41, 42, 43 and 44 for receiving the feet 34, 35, 36 and 37 respectively. The clip is mounted in a similar manner to that described above with regard to FIGS. 11 to 14, but the catches 34a and 35a diagonally positioned in the aperture 39 and subsequently be aligned with one side of the square aperture after the projections 34a and 35a are disposed below the plane of the tray 40. Here also, the valve may be round or may be given another polygonal shape other than square.

In the embodiments illustrated in FIGS. 1 to 17, the valve cover and the clip may move simultaneously with respect to the corresponding tray (1, 14 or 40).

Figures 18, 19, 20:
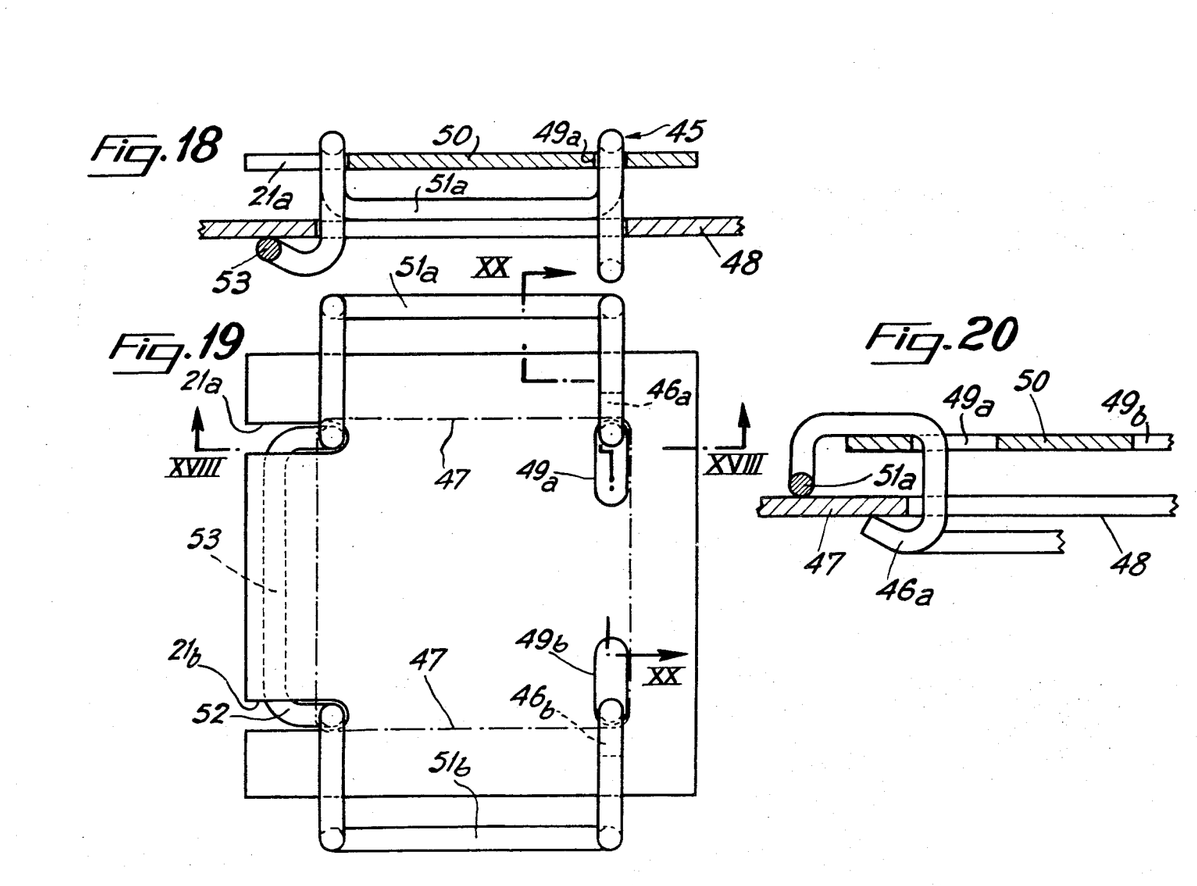

In a further embodiment shown in FIGS. 18 to 20 the clip is fixed together with the tray by means of the buckles 51a 35 and 51b and hooks 46a and 46band buckle 53, and only the cover is movable with respect to the tray, the clip nevertheless assuring guidance of said cover.

On each side the wire forms afterwards a bar or buckle (51a or 51b respectively) which is bent around one edge of the cover engaging eventually in notches (such as 21a or 21b in FIG. 8) arranged in this edge. The middle parts or bars of the buckles 51a and 51b rest also on the upper face of the tray 48 and prevent the clip from descending under gravity.

Figure 21:
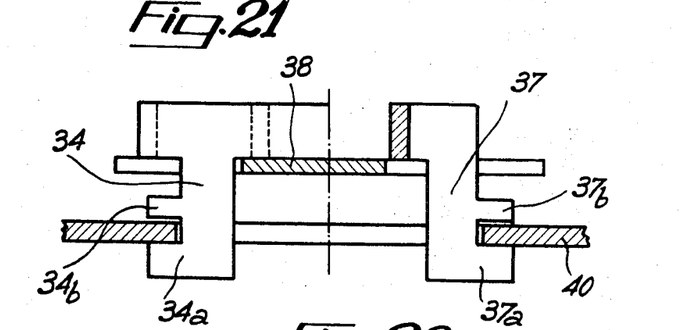
FIGS. 21, 22 and 23 correspond to FIGS. 15, 16 and 17 respectively and show a seventh embodiment of clip of the present invention, FIG. 21 being a section taken along the XXI—XXI of FIG. 22.
Figure 22:
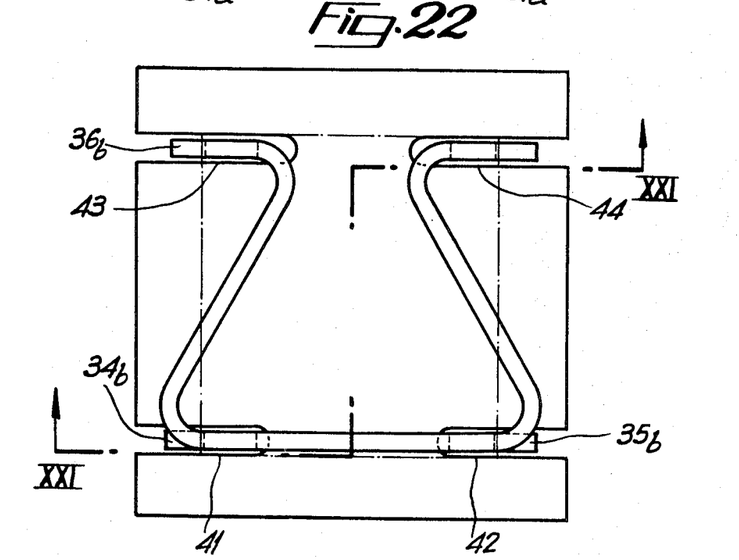
Figure 23:
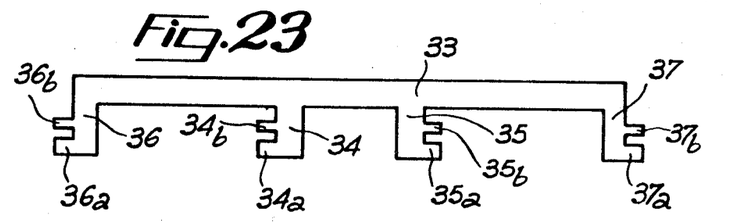

The seventh embodiment, shown in FIGS. 21 to 23, corresponds to that of FIGS. 15, 16, 17 but with the difference that in this case the central feet 34, 35 and the terminal feet 36 and 37 each include two lateral catches 34a and 34b, 35a and 35b, 36a and 36b, 37a and 37b, instead of the single catches employed in FIGS. 15 to 17. The two catches of each foot are separated by a space slightly larger than the thickness of the tray 40. Thus, in this embodiment also, the clip is retained substantially fixed to the tray after being placed in position.

The wire constituting the clip 45 is as in the embodiments of FIGS. 1 to 3 or 7 to 9 terminated at its extremities by two hooks 46a and 46b which are engaged on two sides to opposed sides of opening 47 of the plate 48 after having crossed the elongated apertures 49a and 49b of the cover 50. The middle part of the wire forms a third buckle 52 which, like the buckle 18 shown in FIG. 8, constitutes after shaping a large retaining cap 53 engaged under the plate 48.

The constructions illustrated in the drawings exhibit the following advantages:

a. can be assembled in position at the factory or in the column at a single side of the tray by a single workman for locating and fixing them, operating preferably on the upper face of the tray;

b. are not exposed to and do not expose the tray to receiving considerable forces during mounting or demounting, thus avoiding deformation;

c. can be demounted very easily manually or by means of a tool acting from the upper side of the tray or possibly from below;

d. leave the valve cover the freedom to move relatively to its guiding holding elements and preferably leave the latter free to move relatively to the tray, reducing the risks of blocking the valve in the upper position.

We claim:

1. A valve cap for an exchange column, such cap comprising two separate, relatively movable parts:
   a. a valve cover having an upper face and a lower face and aperture means extending through said cover from said upper face to said lower face; and
   b. a clip having at least two arms disposed to lie above said upper face, legs extending downwardly through said aperture means, and laterally extending portions on said legs spaced from the junction between said arms and said legs, said aperture means and said legs being so arranged that by distortion of the arms in parallel relationship to the cover, said legs and the laterally extending portions thereof may initially be passed through said aperture means and then be repositioned to cause said laterally extending portions to underlie said valve cover.

2. A valve cap as set forth in claim 1, wherein said arm are normally shaped to cause said laterally extending leg portions to underlie the valve cover, and wherein resilient deformation of the arms causes said laterally extending leg portions to pass through said aperture means.

3. A valve cap as set forth in claim 1, wherein the clip is plastically deformable and is initially constructed to permit said laterally extending portions to pass through said aperture means.

4. A valve cap as set forth in claim 1, wherein the clip is formed from a single length of wire suitably bent to form said arms, legs and laterally extending portions.

5. A valve cap as set forth in claim 4, wherein the arms of the clip are arranged in a V configuration, each arm being provided with at least one said leg carrying a laterally extending portion.

6. A valve cap as set forth in claim 5, and including a loop portion joining the arms of the clip, said loop portion and said arms lying in respective perpendicular planes; and outwardly bent end of said loop portion bent away from the plane of the loop portion to form a further laterally extending portion and upwardly bent ends of said legs constituting said laterally extending portions said legs being formed one at the free end of each of the arms, said loop portion constituting a further leg of the clip and said aperture means being arranged to receive said legs and said further leg.

7. A valve cap as set forth in claim 1, wherein the clip comprises a strip of material having said legs and laterally extending portions integrally formed therewith by cutting from a larger sheet of said material.

8. A valve cap as set forth in claim 7, in which said two arms are identical and are symmetrically arranged to form an Ω, each one of said two legs being located at the end of an associated one of said arms which is remote from the junction between said arms, and a further leg formed at the junction between said arms, the laterally extending portions of the two legs being arranged to extend outwardly away from each other.

9. A valve cap as set forth in claim 8, for the control of a fluid flow aperture through an exchange column tray, including two vertically spaced outwardly extending portions on each leg whereby said legs may be placed to extend through said aperture with said tray engaged between said vertically spaced portions to locate the clip with respect to said tray.

10. A valve cap as set forth in claim 7, in which said two arms are identical and symmetrically arranged to form the shape of a lyre, each one of said legs being disposed at the end of an associated one of said arms, which is remote from the junction between said arms and a further leg extending from the junction between said arms, the laterally extending portions of the two first-mentioned legs being arranged to extend divergently away from said further leg whereby said laterally extending portions may be moved away from said further leg by straightening of said arms.

11. A valve cap as set forth in claim 1, wherein said valve cover has a periphery which is undulated.

12. In combination the valve cap of claim 1 and a tray for an exchange column, said tray having at least one fluid flow aperture therethrough, said clip legs extending through said aperture and said laterally extending leg portions of the clip underlying said tray adjacent said aperture.